United States Patent
Zhao

(10) Patent No.: US 12,520,201 B2
(45) Date of Patent: Jan. 6, 2026

(54) PARTIAL SENSING METHOD AND APPARATUS, TERMINAL DEVICE, AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 501 days.

(21) Appl. No.: 17/998,125

(22) PCT Filed: May 9, 2020

(86) PCT No.: PCT/CN2020/089468
§ 371 (c)(1),
(2) Date: Nov. 7, 2022

(87) PCT Pub. No.: WO2021/226760
PCT Pub. Date: Nov. 18, 2021

(65) Prior Publication Data
US 2023/0164637 A1    May 25, 2023

(51) Int. Cl.
H04W 28/26    (2009.01)
H04W 72/044    (2023.01)
H04W 72/40    (2023.01)

(52) U.S. Cl.
CPC ......... *H04W 28/26* (2013.01); *H04W 72/044* (2013.01); *H04W 72/40* (2023.01)

(58) Field of Classification Search
CPC .... H04W 28/26; H04W 72/20; H04W 72/044
See application file for complete search history.

(56) References Cited

U.S. PATENT DOCUMENTS

2020/0029340 A1    1/2020    He et al.
2020/0146070 A1*   5/2020    Xiong ................. H04W 56/001
(Continued)

FOREIGN PATENT DOCUMENTS

CN    106559446 A    4/2017
CN    109479302 A    3/2019
(Continued)

OTHER PUBLICATIONS

European Patent Office, Extended European Search Report issued in Application No. 20935899.3, Apr. 14, 2023, 9 pages.
(Continued)

*Primary Examiner* — James P Duffy
(74) *Attorney, Agent, or Firm* — Finnegan, Henderson, Farabow, Garrett & Dunner, L.L.P.

(57) ABSTRACT

A method for partial sensing is performed by a terminal device and includes: determining a sensing condition based on a first time unit and first information; and determining a second time unit to be sensed based on the sensing condition; wherein the first time unit is a time unit where a candidate time-frequency resource for resource selection for a first sidelink transmission is located, and the first information includes at least one of: an aperiodic resource reservation or a resource reservation with a period Ts as 0 for the first sidelink transmission; or a periodic resource reservation or a resource reservation with the period Ts not as 0 for the first sidelink transmission.

20 Claims, 4 Drawing Sheets

(56) References Cited

U.S. PATENT DOCUMENTS

2020/0284897 A1\* 9/2020 Padaki .................... G01S 7/006
2023/0050353 A1\* 2/2023 Miao ................. H04W 74/0808

FOREIGN PATENT DOCUMENTS

| CN | 110248412 A | 9/2019 |
|----|----|----|
| CN | 110972105 A | 4/2020 |
| WO | WO 2018145067 A1 | 8/2018 |

OTHER PUBLICATIONS

3GPP TR 37.985 V1.1.0 (Feb. 2020), $3^{rd}$ Generation Partnership Project; Technical Specification Group Radio Access Network; Overall description of Radio Access Network (RAN) aspects for Vehicle-to-everything (V2X) based on LTE and NR (Release 16), 33 pages.
International Search Report and Written Opinion of International Application No. PCT/CN2020/089468, mailed Jan. 29, 2021, 12 pages.

\* cited by examiner

PARTIAL SENSING METHOD AND APPARATUS, TERMINAL DEVICE, AND STORAGE MEDIUM

CROSS-REFERENCE TO RELATED APPLICATION

This application is the US national phase application of International Application No. PCT/CN2020/089468, filed on May 9, 2020, the entire contents of which are incorporated herein by reference.

TECHNICAL FIELD

The present disclosure relates to a field of communication technologies, and particularly to a method and an apparatus for partial sensing, a terminal device and a storage medium.

BACKGROUND

In sidelink (SL) communication, a resource reservation and a resource selection method based on channel sensing are supported by terminal devices. Each terminal device periodically reserves a transmission resource of a next period in a current period, senses reservation information sent by other terminal devices on a channel, and predicts interference on the frequency resource in future time according to the reservation information and the corresponding channel measurement result.

Since the constant channel sensing of the terminal device consumes a large amount of electric quantity, a concept of "partial sensing" is introduced to achieve a power-saving effect. In the related art, part of a resource reservation period may be specified by means of a configuration or a pre-configuration. If the terminal device needs to select time-frequency resources on time unit A, the terminal device needs to ensure that sensing is performed on at least one time unit set. The time unit set includes all time units B meeting a following condition: the sidelink transmission on time unit B may perform resource reservation using the resource reservation period on the time-frequency resources on time unit A.

In 5G V2X, more flexible resource reservation period selection is provided. In addition to 10 possible resource reservation periods from 100 ms to 1000 ms, a possible value of the resource reservation period also includes any value from 1 ms to 99 ms. On the other hand, an aperiodic resource reservation is also provided. In view of the above situation, the related art has not yet provided a better solution for how to determine the time unit to be sensed.

SUMMARY

According to one aspect of the present disclosure, a method for partial sensing is provided, which is applied to a terminal device, and includes:
  determining a sensing condition based on a first time unit and first information; and
  determining a second time unit to be sensed based on the sensing condition;
  wherein, the first time unit is a time unit where a candidate time-frequency resource for resource selection for a first sidelink transmission is located, the first information includes: an aperiodic resource reservation or a resource reservation with a period Ts as 0 for the first sidelink transmission; or, a periodic resource reservation or a resource reservation with a period Ts not as 0 for the first sidelink transmission.

According to one aspect of the present disclosure, a terminal device is provided. The device terminal device includes: a processor; a transceiver connected to the processor; and a memory configured to store an executable instruction of the processor, the processor is configured to load and execute the executable instruction to implement the method for partial sensing according to the above aspect.

According to one aspect of the present disclosure, a computer readable storage medium is provided. The computer readable storage medium stores executable instructions, and the executable instructions are loaded and executed by the processor to implement the method for partial sensing according to the above aspect.

BRIEF DESCRIPTION OF THE DRAWINGS

In order to explain the technical solutions in embodiments of the present disclosure more clearly, the drawings described in the embodiments will be briefly introduced below. Obviously, the drawings described below are only some embodiments of the present disclosure. Those skilled in the art may obtain other drawings from these drawings without creative work.

DETAILED DESCRIPTION

In order to make the purpose, technical solutions and advantages of the present disclosure more clear, the embodiments of the present disclosure will be further described below in connection with the accompanying drawings.

First, terms involved in the present disclosure are explained below.

Vehicle to everything (V2X) is a key technology of a future intelligent transportation system, and mainly researches a vehicle data transmission scheme based on a third generation partnership project (3GPP) communication protocol. V2X communications include vehicle to vehicle (V2V) communication, vehicle to infrastructure (V2I) communication, and vehicle to pedestrian (V2V) communication. The V2X application will improve driving safety, reduce congestion and vehicle energy consumption, improve traffic efficiency, etc.

Figure 1:
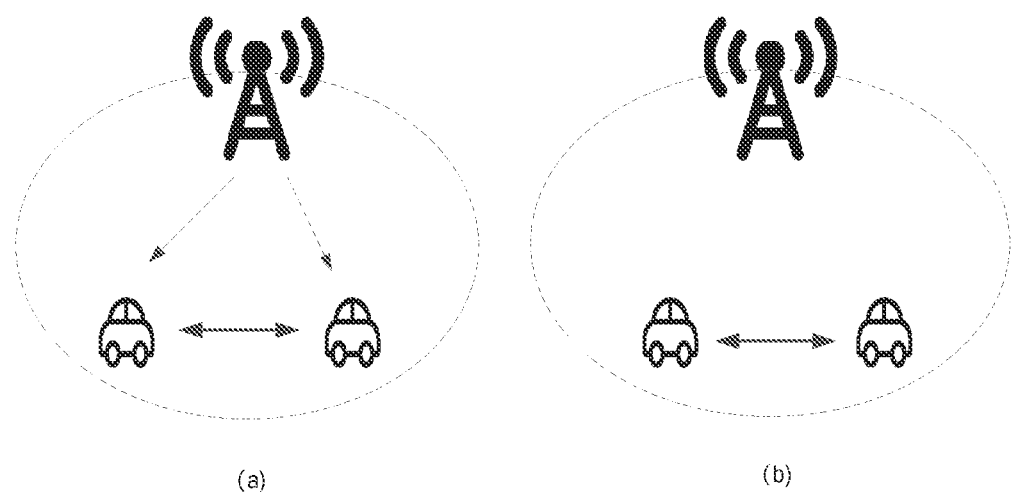
FIG. 1 is a schematic diagram of a transmission mode of sidelink communication according to an example embodiment of the present disclosure.

Sidelink (SL) transmission is a device-to-device communication mode with a high spectrum efficiency and a low transmission delay. Two transmission modes of the sidelink communication are defined in 3GPP: mode A and mode B. As shown in FIG. 1(a), in mode A, resources used by a terminal device during transmission are allocated by the network device through a downlink. The terminal device sends data on a sidelink according to the resources allocated by the network device. The network device may allocate resources for a single transmission to the terminal device, and may also allocate semi-static transmission resources to the terminal device. As shown in FIG. 1(h), in mode B, the terminal device automatically selects one resource in a resource pool for data transmission. Specifically, the terminal device may select transmission resources in the resource pool by sensing, or select transmission resources in the resource pool by random selection.

The embodiments of the present disclosure relate to the above-mentioned mode B. The terminal device adopts a resource reservation and a resource selection method based on channel sensing. Each terminal device periodically reserves the transmission resources of a next period during the current transmission. Compared with the time-frequency resources used for the current transmission, the reserved time-frequency resources occupy the same size and location in frequency with a specified interval of time. Each terminal device needs to constantly sense reservation information sent by other terminal devices on a channel, and predicts interference on a future time-frequency resource according to the reservation information and the corresponding channel measurement result. The terminal device may select a time-frequency resource with a smaller interference as much as possible for data transmission.

Since constant channel sensing of the terminal device will consume a large amount of electric quantity, the concept of "partial sensing" is introduced into the LIE V2X to achieve the power-saving effect (mainly to help handheld terminal devices). Since the period value of the resource reservation in LTE V2X belongs to a limited set (for example, {100, 200, . . . , 1000} ms). For the time-frequency resource on a given time unit, the time position at which the transmission of the time-frequency resource may be reserved also belongs to a limited set (for example, time units of {100, 200, 300, . . . , 1000} ms before the time unit). Therefore, a period of time position (for example, K time units) is given, and the terminal device may only sense sidelink transmission in a previous part of time units (for example, time units which located in {100, 200, 300, . . . , 1000} ms before the K time units), which may not omit all time-frequency resource reservations in the period of time position.

Figure 2:
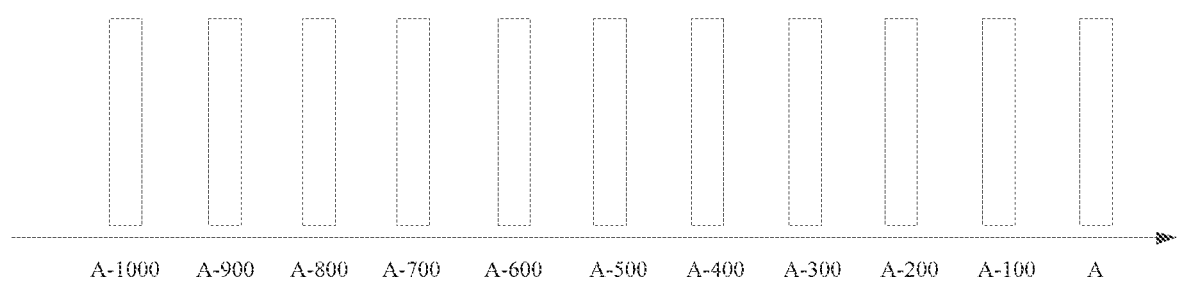
FIG. 2 is a schematic diagram of a method for partial sensing according to an example embodiment of the present disclosure.

For example, with reference to FIG. 2, time unit A is a time unit selected when a terminal device performs resource selection. The terminal device needs to sense time unit A-100, time unit A-200, time unit A-300, time unit A-400, time unit A-500, time unit A-600, time unit A-700, time unit A-800, time unit A-900 and time unit A-1000.

In LTE V2X, the protocol allows the terminal device to only perform resource selection on a limited time set, and ensures that all time positions of time-frequency resources that may be reserved on the time set are sensed. For other time locations, the terminal device may enter an energy saving state. The minimum value of the number of time units of the limited time set for resource selection on the terminal device is limited in a manner of configuration or pre-configuration by a network device, so that a probability of collision is prevented from being increased due to the fact that the time set is too small, or it is possible to avoid the situation that there is no appropriate time-frequency resource to be selected. In addition, the period set for the resource reservation may also be configured or pre-configured, and only some of the periods in the set is selected. The terminal device only needs to ensure that sidelink transmission of resource reservation by using these periods may be sensed.

In 5G V2X, unlike LTE V2X, an aperiodic resource reservation is also supported. Each time the current transmission may reserve at most one or two (determined by a configuration or a pre-configuration) time-frequency resources of the same size at any position in W (logical) time units in the future, W is a positive integer. 5G V2X also supports a periodic resource reservation, which may be enabled and de-enabled by the configuration or the pre-configuration.

Figure 3:
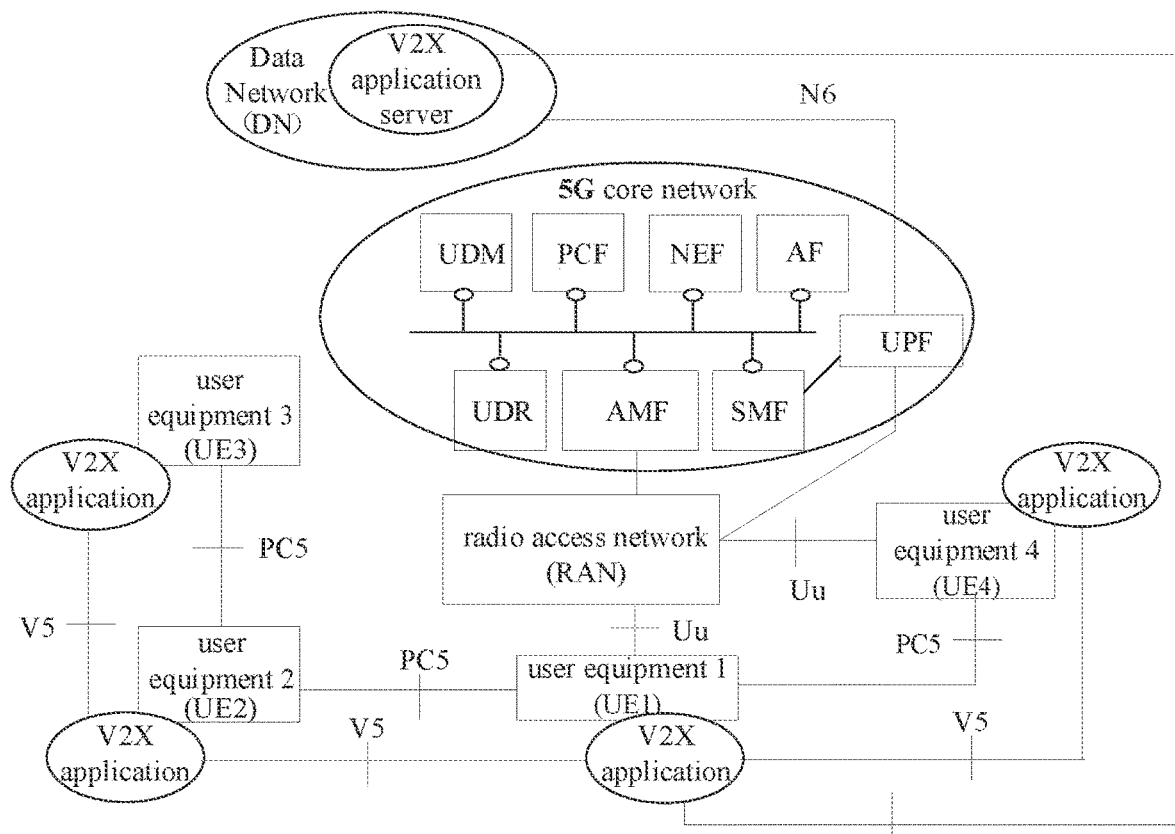
FIG. 3 is a block diagram of a communication system supporting sidelink communication according to an example embodiment of the present disclosure.

FIG. 3 illustrates a block diagram of a communication system supporting sidelink communication according to an example embodiment of the present disclosure. The communication system in the schematic diagram may be a non-roaming 5G system architecture which may be applied to vehicle to everything (V2X) service using D2D technology.

The system architecture includes a data network (DN), and a V2X application server required by the V2X service is arranged in the data network. The system architecture further includes: a 5G core network, and network functions of the 5G core network include: a unified data management (UDM), a policy control function (PCF), a network exposure function (NEF), an application function (AF), a unified data repository (UDR), an access and mobility management function (AMF), a session management function (SW) and a user plane function (UPF).

The system architecture further includes: a new generation-radio access network (NG-RAN) and four example user equipments (i.e., user equipment 1 to user equipment 4), each user equipment is provided with a V2X application. One or more network devices, such as a base station (gNB), are provided in the new generation-radio access network. The user equipments perform uplink transmission to the new access network device.

In the system architecture, the data network is connected with the user plane function in the 5G core network via a N6 reference point, and the V2X application server is connected with a V2X application in a user equipment via a V1 reference point. The new generation-radio access network is connected with the AMF function and the VPF function in the 5G core network. The new generation-radio access network is connected with user equipment 1 and user equipment 4 via a Vu reference point. A plurality of user equipments perform sidelink transmission through a PC5 reference point, and a plurality of V2X applications are connected to each other via a V5 reference point. The reference point may also be referred to as an "interface".

Figure 4:
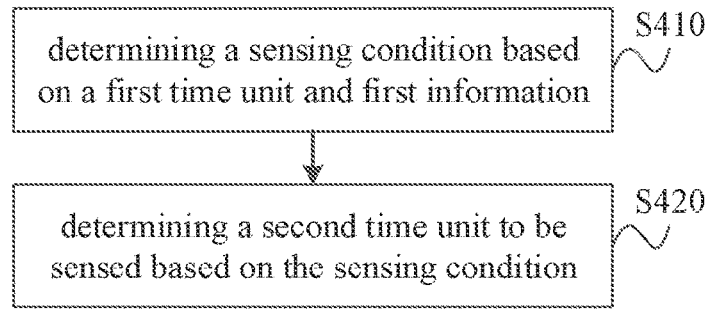
FIG. 4 is a flowchart of a method for partial sensing according to an example embodiment of the present disclosure.

FIG. 4 illustrates a flowchart of a method for partial sensing according to an example embodiment of the present disclosure. The method includes the following steps.

At S410, a sensing condition are determined based on a first time unit and first information.

The first time unit is a time unit where a candidate time-frequency resource for resource selection for a first sidelink transmission is located.

Figure 5:
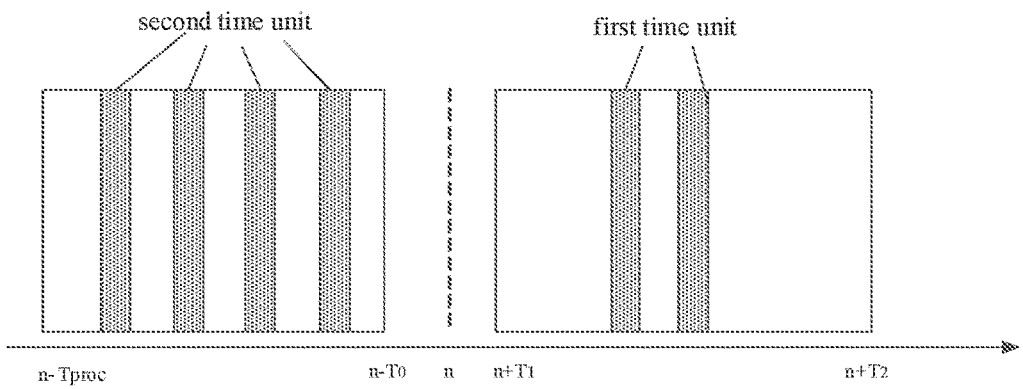
FIG. 5 is a schematic diagram of a method for partial sensing according to an example embodiment of the present disclosure.

For example, with reference to FIG. 5, n is a moment for resource selection for sidelink transmission. A terminal device selects not less than a certain number of first time units in a resource selection window starting from moment $n+T_1$ and ending at moment $n+T_2$. $0 \leq T_1 \leq T_{proc}$, $T_{proc}$ is the maximum time allowed by the terminal device to select resources and prepare data; $T_{2\ min} \leq T_2 \leq$ a delay requirement range of a sidelink transmission service. The value of $T_{2\ min}$ is $\{1, 5, 10, 20\}*2^\mu$ time slots, where $\mu=0, 1, 2$ and $3$ respectively correspond to the cases where the subcarrier spacing is 15 kHz, 30 kHz, 60 kHz and 120 kHz. When $T_{2\ min}$ is greater than the delay requirement range of the sidelink transmission service, $T_2$=the delay requirement range of the sidelink transmission service.

The first information is resource reservation information corresponding to a first sidelink transmission. The first information includes: an aperiodic resource reservation or a resource reservation with a period Ts as 0 for the first sidelink transmission, or a periodic resource reservation or a resource reservation with a period Ts not as 0 for the first sidelink transmission.

Optionally, the periodic resource reservation refers to reserving time-frequency resources of a next period when the terminal device performs the sidelink transmission of a current period. For example, a reservation period is Ts, and when the terminal device performs the first sidelink transmission at moment t, a transmission resource at moment t+Ts is reserved. Sidelink data sent in the current period and the sidelink data sent in the next period are generally different. The value of the reservation period Ts for the periodic resource reservation is generally only a numerical value in a limited set, for example, it may include 0, 100, 200, 300, 400, 500, 600, 700, 800, 900 and 1000 ms.

Optionally, the aperiodic resource reservation refers to reserving the time-frequency resources at any position of a future time unit when the terminal device performs the sidelink transmission of the current period. For example, when the terminal device performs first sidelink transmission at moment t, the transmission resource at moment t+a is reserved, where a may be any moment from 1 to 31. In addition, the terminal device may transmit the same sidelink data as the current periodic sidelink transmission in the time-frequency resource for the aperiodic resource reservation.

The sensing condition are a judgment process of partial sensing adopted by the terminal device to ensure the first sidelink transmission, and the sensing condition may also be understood as a "sensing mode". The terminal device determines the sensing condition based on the above first time unit and the first information.

At S420, the second time unit to be sensed is determined according to the sensing condition.

The second time unit is a time unit that needs to be sensed in a resource sensing window when a transmission collision on the first time unit is determined.

For example, with reference to FIG. 5, n is the moment for resource selection for the sidelink transmission. A second time unit is located in the resource sensing window. The resource sensing window is a time window from $n-T_0$ to $n-Tproc$, and the value of $T_0$ is 100 or 1100 ms, Tproc is a moment at which the terminal device decodes control information.

Since other terminal devices may perform resource reservation (including periodic resource reservation and aperiodic resource reservation) on the second time unit, the time-frequency resources on the first time unit are reserved. This conflicts with the resource selection of the terminal device on the first time unit. Therefore, the terminal device needs to determine, according to the determined sensing condition, the second time unit that needs to be sensed in the resource sensing window before the first time unit.

Optionally, after selecting the first time unit, the terminal device selects, according to the sensing result on the second time unit, the time-frequency resource that is finally used by the first sidelink transmission from the time-frequency resources on the first time unit. For example, the terminal device may obtain the transmission collisions on the first time unit by sensing on the second time unit. When there is a transmission collision, the terminal device determines a possible interference situation when the transmission collision occurs by performing measurement. From the time-frequency resources on the first time unit, the terminal device removes the time-frequency resources with stronger interference reserved by other terminal devices, and selects the finally used time-frequency resource from the remaining time-frequency resources.

Optionally, an interference condition is measured by a reference signal receiving power (RSRP). For example, if the RSRP of the time-frequency resources of the other terminal devices on the second time unit is greater than a threshold, the terminal device determines that the interference is strong.

Optionally, the sensing condition (or the sensing mode) include but are not limited to the following conditions.

1. A first sensing condition needs to be met. The first sensing condition includes: sensing at least on a time unit where a second sidelink transmission may occur. The second sidelink transmission is a sidelink transmission that may perform the periodic resource reservation on the time-frequency resources on the first time unit.

It should be noted that "may" means that the second sidelink transmission performed by a second terminal device has a certain probability to perform the periodic resource reservation on the time-frequency resource on the first time unit, and the first terminal device may not predict the probability. The first terminal device is a terminal device corresponding to the first sidelink transmission, and the second terminal device is another terminal device other than the first terminal device. In some embodiments, there may not be a second terminal device performing the above-mentioned second sidelink transmission.

2. It is not essential to ensure that the first sensing condition is met. The first sensing condition includes: sensing at least on a time unit where a second sidelink transmission may occur. The second sidelink transmission is a sidelink transmission that may perform the periodic resource reservation on time-frequency resources on the first time unit.

Optionally, "it is not essential to ensure that the first sensing condition is met" means that the second time unit selected by the terminal device according to the first sensing condition may be an empty set. That is, the terminal device may ignore the transmission collisions that may be caused by the periodic resource reservation of other terminal devices. By ignoring possible transmission collisions, although the sidelink transmission performance may be degraded, the power consumption of terminal device sensing may be reduced. The terminal device may choose whether to satisfy the first sensing condition according to its own situation. For example, in the case of insufficient power, the terminal device chooses not to meet the first sensing condition.

Optionally, "it is not essential to ensure that the first sensing condition is met" may be understood as one of the following: the first sensing condition is not met, the first sensing condition does not need to be met, and the first sensing condition is not forced to be met.

3. A second sensing condition needs to be met. The second sensing condition includes: sensing at least on a time unit where a third sidelink transmission may occur. The third sidelink transmission is a sidelink transmission that may perform the aperiodic resource reservation on time-frequency resources on the first time unit.

It should he noted that "may" means that the third sidelink transmission performed by the second terminal device has a certain probability to perform aperiodic resource reservation on the time-frequency resource on the first time unit, and the first terminal device may not predict the probability. The first terminal device is a terminal device corresponding to a first sidelink transmission, and the second terminal device is another terminal device other than the first terminal device. In some embodiments, there may not be a second terminal device performing the above-mentioned third sidelink transmission.

4. It is not essential to ensure that the second sensing condition is met. The second sensing condition includes: sensing at least on a time unit where the third sidelink transmission may occur. The third sidelink transmission is a sidelink transmission that may perform the aperiodic resource reservation on time-frequency resources on the first time unit.

Optionally. "it is not essential to ensure that the second sensing condition is met" means that the second time unit selected by the terminal device according to the second sensing condition may be an empty set, That is, the terminal device may ignore the transmission collisions that may be caused by the aperiodic resource reservation of other terminal devices. By ignoring possible transmission collisions, although the sidelink transmission performance may be degraded, the power consumption of terminal device sensing may be reduced. If the possible transmission collisions are selected not to be ignored, the sidelink transmission performance may be ensured. For example, in the case of sufficient power, the terminal device selects to meet the first sensing condition, and performs sensing on the time unit where the third sidelink transmission may occur.

Optionally, "it is not essential to ensure that the second sensing condition is met" may be understood as one of the following: the second sensing condition is not met, the second sensing condition does not need to be met, and the second sensing condition is not forced to be met.

5. A third sensing condition needs to be met. The third sensing condition includes: sensing at least on a time unit where the second sidelink transmission may occur. The second sidelink transmission is a sidelink transmission that may perform the periodic resource reservation using a period Ts on the time-frequency resources on the first time unit.

6. A fourth sensing condition needs to be met. The fourth sensing condition includes: sensing at least on a time unit where the second sidelink transmission may occur, the second sidelink transmission is the sidelink transmission that may perform the periodic resource reservation on time-frequency resources on the first time unit using any period in a third period set, the third period set is a subset of a first period set determined according to the period Ts.

It should be noted that the term "time unit" in the embodiments of the present disclosure includes both a logic time unit and a physical time unit. The logical time unit refers to a time unit that may be used by the sidelink communication. The physical time unit refers to all time units, including a time unit capable of being used by the sidelink communication, and also including a time unit which may not be used by the sidelink communication (for example, a downlink time unit or a time unit occupied by other purposes). The unit of the time unit may be a frame, a subframe, a slot, a symbol, etc., or may be absolute time such as 1 ms, 1 us, etc.

In summary, according to the method of the embodiment, when resource selection for the first sidelink transmission is performed, the terminal device determines, according to the time unit where the candidate time-frequency resource for resource selection for the first sidelink transmission is located and whether the time unit itself performs periodic resource reservation, the second time unit that needs to be partially sensed. No matter whether the first sidelink transmission performs the periodic resource reservation, the second time unit conforming to current resource reservation scenario may be determined, and unnecessary resource sensing is reduced, and therefore the power consumption of the terminal device is saved.

In the alternative embodiment based on FIG. 4, the method includes the following two scenarios.

Scenario 1: the first information including an aperiodic resource reservation or a resource reservation with the period Ts as 0 for the first sidelink transmission.

Scenario 2: the first information including a periodic resource reservation or a resource reservation with the period Ts not as 0 for the first sidelink transmission.

In the two scenarios, the terminal device is configured with the first period set for the periodic resource reservation. For example, the first period set is $T=\{T_1, T_2, \ldots, T_K\}$, altogether K periods, wherein any one of the periods is not equal to 0. Optionally, K is 16.

Figure 6:
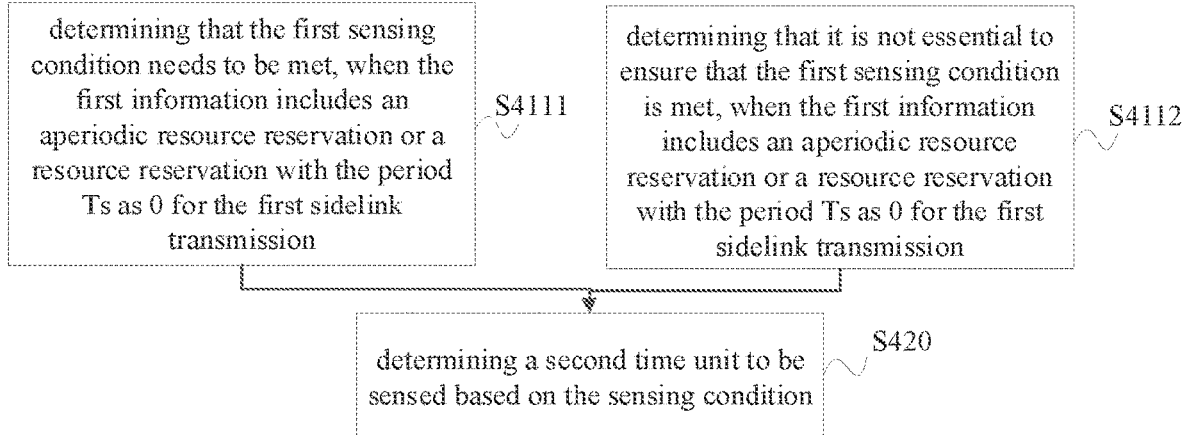
FIG. 6 is a flowchart of a method for partial sensing according to an example embodiment of the present disclosure.

For scenario 1, with reference to FIG. 6, FIG. 6 illustrates a flowchart of a method for partial sensing provided by an example embodiment of the present disclosure, and the method may be applied to a terminal device. In the embodiment, the S410 may be replaced by any one of the following steps.

At S4111, it is determined that a first sensing condition needs to be met, when first information includes an aperiodic resource reservation or a resource reservation with a period Ts as 0 for a first sidelink transmission.

The first sensing condition includes: sensing at least on a time unit where a second sidelink transmission may occur. The second sidelink transmission is a sidelink transmission that may perform the periodic resource reservation on time-frequency resources on the first time unit.

In a V2X system, in addition to terminal device 1, there are several other terminal devices. The other terminal devices perform periodic resource reservation or aperiodic resource reservation when performing sidelink transmissions. For example, the other terminal devices include terminal device 2 and terminal device 3. The sidelink transmission corresponding to terminal device 2 performs the aperiodic resource reservation, and reserves a time-frequency resource on the first time unit. The sidelink transmission corresponding to terminal device 3 performs the periodic resource reservation, and reserves a time-frequency resource on the first time unit. The sidelink transmission corresponding to terminal device 2 does not need to be sensed by terminal device 1, and the sidelink transmission corresponding to terminal device 3 (i.e., the second sidelink transmission) needs to be sensed.

In an implementation, the second sidelink transmission is a sidelink transmission that may perform the periodic resource reservation on the time-frequency resources on the first time unit using any period in first period set.

The first period set is a period set composed of all period values for the periodic resource reservation configured by the terminal device.

For example, the first period set is $T=\{T_1, T_2, \ldots, T_K\}$. The first time unit is time unit A, and the second sidelink transmission may perform the periodic resource reservation on one or more time units in $\{A-T_1, A-T_2, A-T_3, \ldots, A-T_K\}$ to reserve time-frequency resources on time unit A. Since the terminal device determines that the first sensing condition needs to be met, the terminal device needs to perform sensing operations on $\{A-T_1, A-T_2, A-T_3, \ldots, A-T_K\}$.

In another implementation, the second sidelink transmission is a sidelink transmission performing the periodic resource reservation on the time-frequency resource on the first time unit using any period in a second period set, the second period set is a subset of the first period set.

For example, the first period set is $T=\{T_1, T_2, \ldots, T_K\}$, the second period set is $T=\{T_1, T_2, T_3\}$, and is a subset of the first period set. The first time unit is time unit A, and the second sidelink transmission may perform the periodic resource reservation on one or more time units in $\{A-T_1, A-T_2, A-T_3\}$ to reserve time-frequency resources on time unit A. Since the terminal device determines that the first sensing condition needs to be met, the terminal device needs to perform the sensing operations on $\{A-T_1, A-T_2, A-T_3\}$.

At S4112, it is determined that it is not essential to ensure that the first sensing condition is met, when the first information includes the aperiodic resource reservation or the resource reservation with the period Ts as 0 for the first sidelink transmission.

The first sensing condition includes: sensing at least on a time unit where a second sidelink transmission may occur. The second sidelink transmission is a sidelink transmission that may perform the periodic resource reservation on time-frequency resources on the first time unit.

In an implementation, the second sidelink transmission is a sidelink transmission that may perform the periodic resource reservation on the time-frequency resources on the first time unit using any period in a first period set.

For example, the first time unit is time unit A, and the first period set is $T=\{T_1, T_2, \ldots, T_K\}$. The second sidelink transmission may perform the periodic resource reservation on one or more time units in $\{A-T_1, A-T_2, A-T_3, \ldots, A-T_K\}$ to reserve time-frequency resources on time unit A. Since the terminal device determines it is not essential to ensure that the first sensing condition is met, the terminal device does not need to perform the partial sensing operations on $\{A-T_1, A-T_2, A-T_3, \ldots, A-T_K\}$.

In another implementation, the second sidelink transmission is a sidelink transmission performing the periodic resource reservation on the time-frequency resource on the first time unit using any period in a second period set, the second period set being a subset of the first period set.

Optionally, the terminal device obtains second configuration information, and determines the second period set according to the second configuration information.

For example, the first period set is $T=\{T_1, T_2, \ldots, T_K\}$, and the second period set is $T=\{T_1, T_2, T_5\}$, and is a subset of the first period set. The first time unit is time unit A, and the second sidelink transmission may perform the periodic resource reservation on one or more time units in $\{A-T_1, A-T_2, A-T_5\}$ to reserve time-frequency resources on time unit A. Since the terminal device determines it is not essential to ensure that the first sensing condition is met, the terminal device does not need to perform sensing in $\{A-T_1, A-T_2, A-T_5\}$.

In an optional embodiment, the terminal device obtains first configuration information. The terminal device is determined to adopt a manner that needs to meet the first sensing condition according to the first configuration information; or, the terminal device is determined to adopt a manner that does not need to ensure that the first sensing condition is met according to the first configuration information. That is, the terminal device determines to use one of S4111 and S4112 according to the first configuration information.

The first configuration information is determined by a pre-configuration, or, the first configuration information is determined by a first downlink signaling from a network device.

In an implementation, the first configuration information is configured based on a resource pool. Different resource pools correspond to different first configuration information. For example, for resource pool 1, the terminal device needs to meet the first sensing condition. For resource pool 2, the terminal device needs to meet the first sensing condition. For resource pool 3, the terminal device does not need to ensure that the first sensing condition is satisfied.

In an implementation, the first configuration information is configured based on a sidelink bandwidth part (BWP). For example, the terminal device on sidelink BWP1 needs to meet the first sensing condition. The terminal device on sidelink BWP2 does not need to ensure that the first sensing condition is met.

In an implementation, the first configuration information is configured based on the terminal device. For example, for terminal device 1, the first sensing condition needs to be met. For terminal device 2, it is not essential to ensure that the first sensing condition is met.

In an implementation, the first configuration information is configured based on a cell. All terminal devices in a cell use the same sensing condition. For example, the terminal device in cell 1 needs to meet the first sensing condition. The terminal device in cell 2 does not need to ensure that the first sensing condition is met.

In an implementation, the first configuration information is configured based on priorities for the sidelink transmission. For different priorities for the sidelink transmission, the terminal device may be configured to use different sensing conditions. For example, for priority 1 for the sidelink transmission, configuration of the terminal device needs to meet the first sensing condition. For priority 2 for the sidelink transmission, the configuration of the terminal device does not need to ensure that the first sensing condition is met.

In an implementation, the first configuration information is configured based on a communication mode. For example, for a unicast communication, the configuration of the terminal device needs to meet the first sensing condition. For a multicast communication, it is not essential to ensure that the configuration of the terminal device meets the first sensing condition. For a broadcast communication, the terminal device shall be configured to meet the first sensing condition.

In an implementation, the first configuration information is configured based on a resource selection mode. For example, for the resource selection method using partial sensing, the configuration of the terminal device needs to meet the first sensing condition.

In summary, in the method provided in the embodiment, when the aperiodic resource reservation or the resource reservation with the period Ts as 0 for the first sidelink transmission is performed, the terminal device selects whether the first sensing condition needs to be met. That is, whether the time unit needs to be sensed where the sidelink transmission that may perform the periodic resource reservation on the first time unit is located, the flexibility of the methods for partial sensing is ensured.

Figure 7:
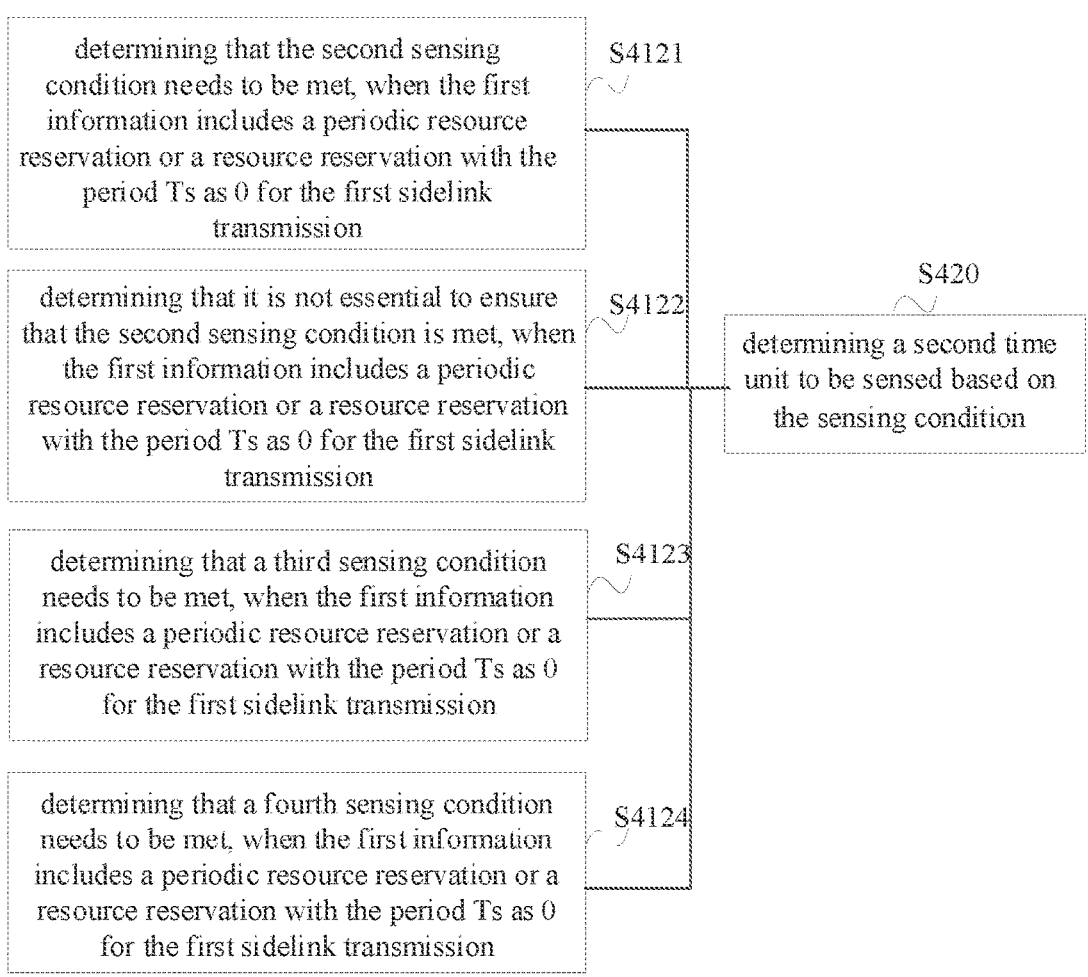
FIG. 7 is a flowchart of a method for partial sensing according to an example embodiment of the present disclosure.
Figure 8:
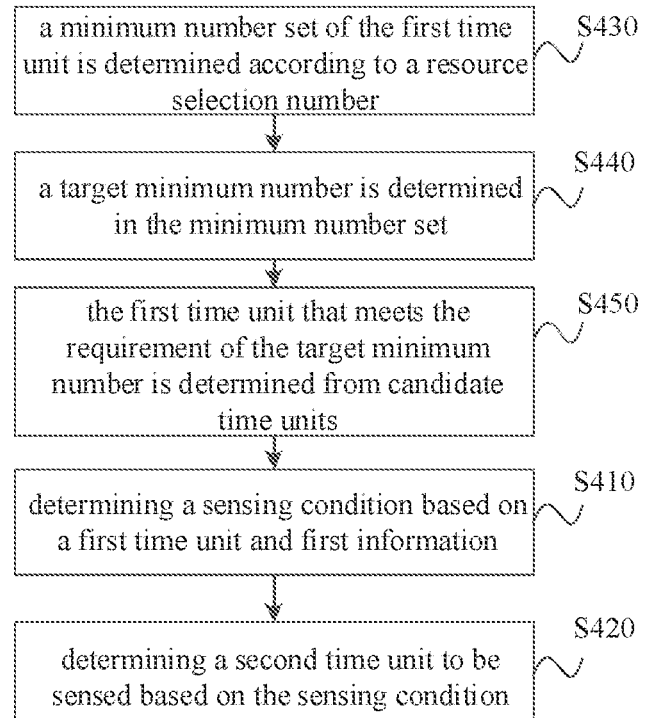
FIG. 8 is a flowchart of a method for partial sensing according to an example embodiment of the present disclosure.

For scenario 2, with reference to FIG. 7. FIG. 7 illustrates a flowchart of a method for partial sensing provided by an example embodiment of the present disclosure, and the method may be applied to a terminal device. In the embodiment, the S410 may be replaced by any one of the following steps.

At S4121, it is determined that a second sensing condition needs to be met, when the first information includes a periodic resource reservation or a resource reservation with the period Ts as 0 for the first sidelink transmission.

The second sensing condition includes: sensing at least on a time unit where a third sidelink transmission may occur. The third sidelink transmission is a sidelink transmission that may perform the aperiodic resource reservation on time-frequency resources on the first time unit.

In the V2X system, in addition to terminal device 1, there are several other terminal devices. The other terminal devices perform the periodic resource reservation or the aperiodic resource reservation when performing sidelink transmission. For example, the other terminal devices include terminal device 2 and terminal device 3. The sidelink transmission corresponding to terminal device 2 performs the aperiodic resource reservation, and reserves a time-frequency resource on the first time unit. The sidelink transmission corresponding to terminal device 3 performs the periodic resource reservation, and reserves a time-frequency resource on the first time unit. Terminal device 1 needs to sense the sidelink transmission corresponding to terminal device 2 (i.e., the third sidelink transmission), and does not need to sense the sidelink transmission corresponding to the terminal device 3 (i.e., the second sidelink transmission).

For example, the third sidelink transmission may perform the aperiodic resource reservation on time unit $A-T_i$, and reserve the time-frequency resources on the time unit A, and $T_i$ is any one of 0 to 32 time slots. Since the terminal device determines that the second sensing condition needs to be met, the terminal device needs to perform sensing in 32 time slots before time unit A.

At S4122, it is determined that it is not essential to ensure that the second sensing condition is met, when the first information includes the periodic resource reservation or the resource reservation with the period Ts as 0 for the first sidelink transmission.

The second sensing condition includes: sensing at least on a time unit where the third sidelink transmission may occur. The third sidelink transmission is a sidelink transmission that may perform the aperiodic resource reservation on time-frequency resources on the first time unit.

For example, the third sidelink transmission may perform aperiodic resource reservation on time unit $A-T_i$, and reserve the time-frequency resources on the time unit A, and $T_i$ is any one of 0 to 32 time slots. Since the terminal device determines that it is not essential to ensure that the second sensing condition is met, the terminal device does not need to perform sensing in 32 time slots before time unit A.

In an optional embodiment, the terminal device obtains a third configuration information. A manner that needs to meet the second sensing condition is adopted according to the third configuration information; or, a manner that does not need to ensure that the second sensing condition is met is adopted according to the third configuration information. That is, the terminal device determines to adopt one of S4121 and S4122 according to the third configuration information.

The third configuration information is determined by a pre-configuration, or, the third configuration information is determined by a third downlink signaling from a network device.

In an implementation, the third configuration information is configured based on a resource pool. In an implementation, the third configuration information is configured based on a sidelink BWP. In an implementation, the third configuration information is configured based on the terminal device. In an implementation, the third configuration information is configured based on a cell.

In an implementation, the third configuration information is configured based on priorities for the sidelink transmission. In an implementation, the third configuration information is configured based on a communication mode. In an implementation, the third configuration information is configured based on a resource selection mode.

At S4123, it is determined that a third sensing condition needs to be met, when the first information includes the periodic resource reservation or the resource reservation with the period Ts as 0 for the first sidelink transmission.

The third sensing condition includes: sensing at least on a time unit where a second sidelink transmission may occur. The second sidelink transmission is a sidelink transmission that may perform the periodic resource reservation using a period Ts on the time-frequency resources of the first time unit.

For example, the second sidelink transmission may perform resource reservation on time unit $A-T_i$ to reserve the time-frequency resource on the time unit A. Since the terminal device determines that the third sensing condition needs to be met, the terminal device needs to perform sensing in 32 time slots before time unit A.

At S4124, it is determined that a fourth sensing condition needs to be met, when the first information includes the periodic resource reservation or the resource reservation with the period Ts as 0 for the first sidelink transmission.

The fourth sensing condition includes: sensing at least on a time unit where the second sidelink transmission may occur, the second sidelink transmission is a sidelink transmission that may perform the periodic resource reservation on time-frequency resources of the first time unit using any period in a third period set, and the third period set is a subset of the first period set determined according resource reservation period Ts.

For example, the third period set T={Ts, 2*Ts, 3*Ts} is a subset of the first period set determined according to the resource reservation period Ts. The second sidelink transmission may perform the periodic resource reservation on one or more time units in {A-Ts, A-2*Ts, A-3*Ts} to reserve time-frequency resources on time unit A. Since the terminal device determines that the fourth sensing condition needs to be met, the terminal device needs to perform sense in time units {A-Ts, A-2*Ts, A-3*Ts}.

Optionally, the period value in the third period set is an integer multiple of the period Ts, or the period Ts is an integer multiple of a period value in the third period set.

For example, the first period set is T={100, 200, 300, 400, 500, 600, 700, 800, 900, 1000}. If the resource reservation period Ts=200, the third period set is {100, 200, 400, 600, 800, 1000}; if the reservation period Ts=300, the third period set is {100, 300, 600, 900}.

In an optional embodiment, the terminal device obtains the fourth configuration information. The third period set is determined according to the fourth configuration information. The fourth configuration information includes the third period set, and a first mapping relationship between the reservation period Ts and the third period set.

For example, Table 1 is shown as:

TABLE 1

| reservation period Ts | third period set |
|---|---|
| 0 | null |
| 100 | 100, 200, 300, 400, 500 |
| 200 | 100, 200, 400 |
| ... | ... |

The terminal device determines the third period set according to the first mapping relationship indicated by the fourth configuration information. For example, if the period Ts is 200, the third period set is {100, 200, 400}.

The fourth configuration information is determined by a pre-configuration, or, fourth configuration information is determined by a fourth downlink signaling from a network device.

In an implementation, the fourth configuration information is configured based on a resource pool. In an implementation, the fourth configuration information is configured based on a sidelink BWP. In an implementation, the fourth configuration information is configured based on the terminal device. In an implementation, the fourth configuration information is configured based on a cell.

In an implementation, the fourth configuration information is configured based on priorities for the sidelink transmission. In an implementation, the fourth configuration information is configured based on a communication mode. In an implementation, the fourth configuration information is configured based on a resource selection mode.

In summary, in the method provided in the embodiment, when the periodic resource reservation is performed or the resource reservation period Ts is not 0 for the first sidelink transmission, the terminal device selects whether the second sensing condition needs to be met, that is, whether the sense needs to be performed on the time unit where the sidelink transmission that may perform periodic resource reservation on the first time unit is located. Or the third sensing condition needing to be met is selected, that is, the time unit where the sidelink transmission that may use the reservation period Ts for periodic resource reservation on the first time unit is located. Or the fourth sensing condition needing to be met is selected, that is, the time unit where the sidelink transmission that may use the third periodic set for periodic resource reservation on the first time unit is located. Thus, a flexibility of partial sensing is guaranteed.

In an optional embodiment based on FIG. 4, FIG. 6, and FIG. 7, FIG. 8 illustrates a flowchart of a method for partial sensing provided by an example embodiment of the present disclosure, and the method may be applied to a terminal device. In this embodiment, the method further includes the following steps.

At S430, a minimum number set of a first unit is determined according to a resource selection number.

The resource selection number is a number of time-frequency resources that need to be selected when the terminal device performs resource selection. Optionally, the number of resource selections is positively correlated with transmission times of sidelink data. That is, the more the transmission times of the sidelink data are, the greater the resource selection number is.

The minimum number set is a set of the minimum number of time units that may be selected by the terminal device during resource selection.

In an optional embodiment, the terminal device obtains a second mapping relationship between the resource selection number and the minimum number set. The second mapping relationship is determined by a pre-configuration, or the second mapping relationship is determined by a fifth downlink signaling from the network device.

For example, Table 2 is shown as:

TABLE 2

| resource selection number | minimum number set |
|---|---|
| 1 | {1, 2, 3, 4} |
| 2 | {2, 4, 8, 10} |
| ... | ... |

When the terminal device needs to select more time-frequency resources, that is, when the number of resource selections is larger, more time units are usually required to ensure that appropriate time-frequency resources may be selected to avoid possible transmission collisions. After a required resource selection number is given, the terminal device may obtain the minimum number set according to the second mapping relationship.

At S440, a target minimum number is determined in the minimum number set.

The terminal device selects a minimum number from the minimum number set as the target minimum number. For example, with reference to Table 2, when the resource selection number is 1, the terminal device may be configured to select one of {1, 2, 3, 4} as the target minimum number.

Optionally, the terminal device determines the target minimum number from the minimum number set by a pre-configuration or by a sixth downlink signaling from the network device.

At S450, the first time unit that meets the requirement of the target minimum number is determined from candidate time units.

The candidate time units are a time window corresponding to when the terminal device performs resource selection. The candidate time units include several time units, and the terminal device determines the first time unit in the candidate time units.

For example, n is the time for resource selection for sidelink transmission. The candidate time units are a resource selection window starting at time n+T1 and ending at time n±T2. For example, if the target minimum number is 2, the terminal device selects not less than two time units from the candidate time units as the first time unit.

In summary, according to the method provided by the embodiment, when the terminal device determines the first time unit, the minimum number of the first time unit is determined according to the resource selection number. The situation that the number of the first time unit is too small is avoided. It is ensured that the terminal device may select appropriate time-frequency resources for the first sidelink transmission.

It should be noted that the embodiments of the method may be implemented separately or in combination, which is not limited in the present disclosure.

Figure 9:
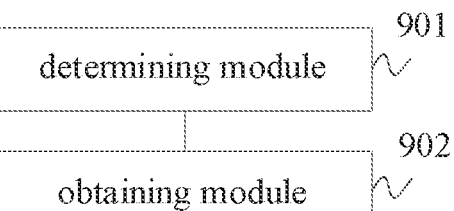
FIG. 9 is a block diagram of an apparatus for partial sensing according to an example embodiment of the present disclosure.

FIG. 9 shows a schematic diagram of an apparatus for partial sensing provided by an example embodiment of the present application. The apparatus may be implemented as a terminal device, or may be implemented as a part of the terminal device. The apparatus includes: a determining module 901.

The determining module 901 is configured to determine a sensing condition based on a first time unit and first information.

The determining module 901 is configured to determine a second time unit to be sensed based on the sensing condition.

The first time unit is a time unit where a candidate time-frequency resource for resource selection for a first sidelink transmission is located. The first information includes: an aperiodic resource reservation or a resource reservation with a period Ts as 0 for the first sidelink transmission; or, a periodic resource reservation or a resource reservation with a period Ts not as 0 for the first sidelink transmission.

In some optional embodiments, the apparatus further includes an obtaining module 902.

In an optional embodiment, the determining module 901 is configured to determine that a first sensing condition needs to be met, when the first information includes the aperiodic resource reservation or the resource reservation with a period Ts as 0 for the first sidelink transmission; or the determining module 901 is configured to determine that it is not essential to ensure that the first sensing condition is met, when the first information includes the aperiodic resource reservation or the resource reservation with a period Ts as 0 for the first sidelink transmission. The first sensing condition includes sensing at least on a time unit where a second sidelink transmission may occur. The second sidelink transmission is a sidelink transmission that may perform the periodic resource reservation on time-frequency resources of the first time unit.

In an optional embodiment, the obtaining module 902 is configured to obtain the first configuration information. The determining module 901 is configured to determine to adopt a manner that needs to meet the first sensing condition according to the first configuration information. Or, the determining module 901 is configured to determine to adopt a manner that does not need to ensure that the first sensing condition is met according to the first configuration information.

In an optional embodiment, the first configuration information is determined by a pre-configuration, or, the first configuration information is determined by a first downlink signaling from a network device.

In an optional embodiment, the first configuration information is configured based on a resource pool. Or, the first configuration information is configured based on a sidelink bandwidth part (BWP). Or, the first configuration information is configured based on the terminal device. Or, the first configuration information is configured based on a cell. Or, the first configuration information is configured based on priorities for the sidelink transmission. Or, the first configuration information is configured based on a communication mode. Or, the first configuration information is configured based on a resource selection mode.

In an optional embodiment, the terminal device is configured with a first period set for the periodic resource reservation. The second sidelink transmission is a sidelink transmission that may perform the periodic resource reservation on the time-frequency resources of the first time unit using any period in the first period set. Or, the second sidelink transmission is a sidelink transmission that may perform the periodic resource reservation on the time-frequency resource of the first time unit using any period in a second period set, and the second period set is a subset of the first period set.

In an optional embodiment, the obtaining module 902 is configured obtain a second configuration information. The determining module 901 is configured to determine the second period set according to the second configuration information.

In an optional embodiment, the second configuration information is determined by a pre-configuration, or, the second configuration information is determined by a first downlink signaling from a network device.

In an optional embodiment, the determining module 901 is configured to determine that the second sensing condition needs to be met, when the first information includes the periodic resource reservation or the resource reservation with a period Ts not as 0 for the first sidelink transmission. Or the determining module 901 is configured to determine that it is not essential to ensure that the second sensing condition is met, when the first information includes the periodic resource reservation or the resource reservation with a period Ts not as 0 for the first sideline transmission. The second sensing condition includes sensing at least on a time unit where a third sidelink transmission may occur. The third sidelink transmission is a sidelink transmission that may perform the periodic resource reservation on time-frequency resources of the first time unit.

In an optional embodiment, the obtaining module 902 is configured to obtain a third configuration information. The determining module 901 is configured to determine to adopt a manner that needs to meet the second sensing condition according to the third configuration information. Or, the determining module 901 is configured to determine to adopt a manner that does not need to ensure that the second sensing condition is met according to the third configuration information.

In an optional embodiment, the third configuration information is determined by a pre-configuration, or, the third configuration information is determined by a third downlink signaling from a network device.

In an optional embodiment, the third configuration information is configured based on a resource pool. Or, the third configuration information is configured based on a sidelink (BWP). Or, the third configuration information is configured based on the terminal device. Or, the third configuration information is configured based on a cell. Or, the third configuration information is configured based on priorities for the sidelink transmission. Or, the third configuration information is configured based on a communication mode. Or, the third configuration information is configured based on a resource selection mode.

In an optional embodiment, the determining module 901 is configured to determine that the third sensing condition needs to be met, when the first information includes the periodic resource reservation or the resource reservation with a period Ts not as 0 for the first sidelink transmission. The third sensing condition includes sensing at least on a time unit where a second sidelink transmission may occur. The second sidelink transmission is a sidelink transmission that may perform the periodic resource reservation on the time-frequency resources of the first time unit.

In an optional embodiment, the terminal device is configured with a first period set for the periodic resource reservation. The determining module 901 is configured to determine that the fourth sensing condition needs to be met when the first information includes the periodic resource reservation or a resource reservation with a period Ts not as 0 for the first sidelink transmission. The fourth sensing condition includes: sensing at least on a time unit where a second sidelink transmission may occur. The second sidelink transmission is a sidelink transmission that may perform the periodic resource reservation on the time-frequency resources of the first time unit using any period in a third period set. The third period set is a subset of the first period set determined according to the reservation period Ts.

In an optional embodiment, the period value in the third period set is an integer multiple of the period Ts, or the period Ts is an integer multiple of a period value in the third period set.

In an optional embodiment, the obtaining module 902 is configured obtain the fourth configuration information. The determining module 901 is configured to determine the third period set according to the fourth configuration information. The fourth configuration information includes the third period set, and a first mapping relationship between the reservation period Ts and the third period set.

In an optional embodiment, the fourth configuration information is determined by a pre-configuration, or, the fourth configuration information is determined by a fourth downlink signaling from a network device.

In an optional embodiment, the fourth configuration information is configured based on a resource pool. Or, the fourth configuration information is configured based on a sidelink (MVP). Or, the fourth configuration information is configured based on the terminal device. Or, the fourth configuration information is configured based on a cell. Or, the fourth configuration information is configured based on priorities for the sidelink transmission. Or, the fourth configuration information is configured based on a communication mode. Or, the fourth configuration information is configured based on a resource selection mode.

In an optional embodiment, the determining module 901 is configured to determine the minimum number set of first time units according to the resource selection number. The determining module 901 is configured to determine a target minimum number according to the minimum number set. The determining module 901 is configured to determine the first time unit meeting the target minimum number in the candidate time units.

In an optional embodiment, the obtaining module 902 is configured to obtain a second mapping relationship between the resource selection number and the minimum number set. The second mapping relationship is determined by a pre-configuration, or the second mapping relationship is determined by the fifth downlink signaling from the network device.

Figure 10:
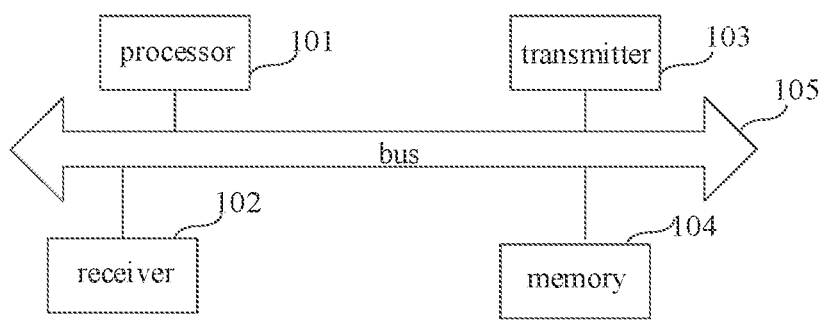
FIG. 10 is a block diagram of a terminal device according to an example embodiment of the present disclosure.

FIG. 10 is a schematic diagram illustrating a structure of a terminal device provided according to an example embodiment. The terminal device includes a processor 101, a receiver 102, a transmitter 103, a memory 104 and a bus 105.

The processor 101 includes one or more processing cores, and the processor 101 executes various function applications and information processing by running a software program or a module.

The receiver 102 and the transmitter 103 may be implemented as a communication component, which may be a communication chip.

The memory 104 is communicatively coupled to the processor 101 through the bus 105.

The memory 104 may be configured to store at least one instruction, and the processor 101 is configured to execute the at least one instruction to implement all blocks in the above embodiment.

In addition, the memory 104 may be implemented by any type of volatile or non-volatile storage devices or their combination. The volatile or non-volatile storage device includes but not limited to a magnetic disk or an optical disk, an electrically erasable programmable read only memory (EEPROM), an erasable programmable read only memory (EPROM), a static random access memory (SRAM), a read-only memory (ROM), a magnetic memory, a flash memory and a programmable read-only memory (PROM).

One example embodiment of the present disclosure further provides a computer readable storage medium, in which the computer readable storage medium stores at least one instruction, at least one program, a code set and an instruction set, the at least one instruction, the at least one program, the code set or the instruction set being loaded and executed by the processor to implement the methods for partial sensing executed by the communication device provided by the above-mentioned various method embodiments.

Those skilled in the art may understand that all or part of the blocks in the above embodiments may be implemented by hardware, or by a program to instruct relevant hardware, in which the program may be stored in a computer readable storage medium which may be a read-only memory, a magnetic disk or an optical disk, etc.

The above are only some embodiments of the present disclosure, and do not constitute the limitation of the present disclosure. Any modification, equivalent replacement, improvement, etc., made within the spirit and principle of embodiments of the present disclosure shall be included within the protection scope of embodiments of the present disclosure.

What is claimed is:

1. A method for partial sensing, performed by a terminal device, comprising:
    determining a sensing condition based on a first time unit and first information; and
    determining a second time unit to be sensed based on the sensing condition;
    wherein the first time unit is a time unit where a candidate time-frequency resource for resource selection for a first sidelink transmission is located, and the first information comprises at least one of:
    an aperiodic resource reservation or a resource reservation with a period Ts as 0 for the first sidelink transmission; or
    a periodic resource reservation or a resource reservation with the period Ts not as 0 for the first sidelink transmission;
    wherein determining the sensing condition based on a first time unit and a first information comprises:
        determining that it is not essential to ensure the first sensing condition is met, in response to the first information comprising that the periodic resource reservation or the resource reservation with the period Ts not as 0 for the first sidelink transmission;
    wherein the first sensing condition comprises: sensing at least on a time unit where a second sidelink transmission may occur, the second sidelink transmission is a sidelink transmission that may perform the periodic resource reservation on time-frequency resources of the first time unit.

2. The method of claim 1, wherein determining the sensing condition based on a first time unit and a first information further comprises:
- determining that a first sensing condition needs to be met, in response to the first information comprising that the aperiodic resource reservation or the resource reservation with the period Ts as 0 for the first sidelink transmission.

3. The method of claim 2, further comprising:
- obtaining first configuration information; and
- determining, according to the first configuration information, at least one of a manner in which the first sensing condition needs to be met, or a manner that does not need to ensure that the first sensing condition is met.

4. The method of claim 3, wherein,
- the first configuration information is determined by at least one of a pre-configuration or a first downlink signaling from a network device.

5. The method of claim 3, wherein the first configuration information is configured based on at least one of:
- a resource pool;
- a sidelink bandwidth part (BWP);
- the terminal device;
- a cell;
- priorities for sidelink transmissions;
- a communication mode; or
- a resource selection mode.

6. The method of claim 2, wherein the terminal device is configured with a first period set for the periodic resource reservation; and
- the second sidelink transmission is a sidelink transmission that may perform the periodic resource reservation on the time-frequency resources of the first time unit using at least one of:
- any period in the first period set; or
- any period in a second period set, the second period set being a subset of the first period set.

7. The method of claim 6, further comprising:
- obtaining second configuration information; and
- determining the second period set according to the second configuration information.

8. The method of claim 7, wherein,
- the second configuration information is determined by at least one of a pre-configuration, or a second downlink signaling from a network device.

9. The method of claim 1, wherein determining the sensing condition based on a first time unit and a first information comprises at least one of:
- determining that the second sensing condition needs to be met, in response to the first information comprising that the periodic resource reservation or the resource reservation with the period Ts not as 0 for the first sidelink transmission; or
- determining that it is not essential to ensure that the second sensing condition is met, in response to the first information comprising that the periodic resource reservation or the resource reservation with the period Ts not as 0 for the first sidelink transmission;
- wherein the second sensing condition comprises: sensing at least on a time unit where a third sidelink transmission may occur, the third sidelink transmission is a sidelink transmission that may perform the aperiodic resource reservation on time-frequency resources of the first time unit.

10. The method of claim 9, further comprising:
- obtaining third configuration information;
- determining, according to the third configuration information, at least one of a manner in which the second sensing condition needs to be met, or a manner in which the second sensing condition does not need to be met.

11. The method of claim 10, wherein,
- the third configuration information is determined by at least one of a pre-configuration or a third downlink signaling from a network device.

12. The method of claim 10, wherein the third configuration information is configured based on at least one of:
- a resource pool;
- a sidelink BWP;
- the terminal device;
- a cell;
- priorities for sidelink transmissions;
- a communication mode;
- a resource selection mode.

13. The method of claim 1, wherein determining the sensing condition based on a first time unit and a first information comprises:
- determining that a third sensing condition needs to be met, in response to the first information comprising that the periodic resource reservation or the resource reservation with the period Ts not as 0 for the first sidelink transmission;
- wherein the third sensing condition comprises: sensing at least on a time unit where a second sidelink transmission may occur, wherein the second sidelink transmission is a sidelink transmission that may perform the periodic resource reservation using the period Ts on time-frequency resources of the first time unit.

14. The method of claim 1, wherein the terminal device is configured with a first period set for the periodic resource reservation; and
- determining the sensing condition based on the first time unit and the first information comprises:
- determining that a fourth sensing condition needs to be met, in response to the first information comprising that the periodic resource reservation or the resource reservation with the period Ts not as 0 for the first sidelink transmission;
- wherein the fourth sensing condition comprises: sensing at least on a time unit where a second sidelink transmission may occur, the second sidelink transmission is a sidelink transmission that may perform the periodic resource reservation on time-frequency resources of the first time unit using any period in a third period set, the third period set being a subset of the first period set determined according to the period Ts.

15. The method of claim 14, wherein,
- a period value in the third period set is an integer multiple of the period Ts, or the period Ts is an integer multiple of a period value in the third period set.

16. The method of claim 14, further comprising:
- obtaining fourth configuration information; and
- determining the third period set according to the fourth configuration information;
- wherein, the fourth configuration information comprises the third period set, and a first mapping relationship between the period Ts and the third period set.

17. The method of claim 16, wherein the fourth configuration information is determined by at least one of:
- a pre-configuration;
- a fourth downlink signaling from a network device;

a resource pool;
a sidelink BWP;
the terminal device;
a cell;
priorities for sidelink transmissions;
a communication mode; or
a resource selection mode.

18. The method of claim 1, further comprising:
determining a minimum number set of the first time unit according to a resource selection number;
determining a target minimum number in the minimum number set; and
determining the first time unit satisfying a requirement of the target minimum number in candidate time units.

19. The method of claim 18, further comprising:
obtaining a second mapping relationship between the resource selection number and the minimum number set;
wherein the second mapping relationship is determined by at least one of a pre-configuration, or a fifth downlink signaling from a network device.

20. A terminal device, comprising:
a processor;
a transceiver connected to the processor; and
a memory configured to store instructions executable by the processor;
wherein the processor is configured to:
determine a sensing condition based on a first time unit and first information; and
determine a second time unit to be sensed based on the sensing condition;
wherein the first time unit is a time unit where a candidate time-frequency resource for resource selection for a first sidelink transmission is located, and the first information comprises at least one of:
an aperiodic resource reservation or a resource reservation with a period Ts as 0 for the first sidelink transmission; or
a periodic resource reservation or a resource reservation with the period Ts not as 0 for the first sidelink transmission;
wherein determining the sensing condition based on a first time unit and a first information comprises:
determining that it is not essential to ensure the first sensing condition is met, in response to the first information comprising that the periodic resource reservation or the resource reservation with the period Ts not as 0 for the first sidelink transmission;
wherein the first sensing condition comprises: sensing at least on a time unit where a second sidelink transmission may occur, the second sidelink transmission is a sidelink transmission that may perform the periodic resource reservation on time-frequency resources of the first time unit.

* * * * *